United States Patent
Barrett et al.

(10) Patent No.: US 11,840,241 B1
(45) Date of Patent: Dec. 12, 2023

(54) ADJUSTING DRIVER ASSIST TECHNOLOGY BASED ON VEHICLE RIDE HEIGHT

(71) Applicant: Ford Global Technologies, LLC, Dearborn, MI (US)

(72) Inventors: Jordan Barrett, Milford, MI (US); Keith Weston, Canton, MI (US); Brendan Francis Diamond, Grosse Pointe, MI (US); Michael Alan McNees, Flat Rock, MI (US); Andrew Denis Lewandowski, Sterling Heights, MI (US); Matthew Johnson, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/866,839

(22) Filed: Jul. 18, 2022

(51) Int. Cl.
*B60W 40/101* (2012.01)
*B60W 40/12* (2012.01)

(52) U.S. Cl.
CPC .......... *B60W 40/101* (2013.01); *B60W 40/12* (2013.01); *B60W 2520/14* (2013.01)

(58) Field of Classification Search
CPC .............. B60W 40/101; B60W 40/12; B60W 2520/14
See application file for complete search history.

(56) References Cited

U.S. PATENT DOCUMENTS

| | | | |
|---|---|---|---|
| 11,029,390 | B2 | 6/2021 | Fath et al. |
| 2007/0114091 | A1* | 5/2007 | Biallas ................ F16H 61/0213 180/338 |
| 2017/0225729 | A1* | 8/2017 | Yakimishyn ......... B62D 61/125 |
| 2020/0262477 | A1* | 8/2020 | Hirao ..................... B60W 30/08 |
| 2021/0387637 | A1 | 12/2021 | Rogers et al. |
| 2023/0069363 | A1* | 3/2023 | Bush ..................... G05D 1/0055 |

FOREIGN PATENT DOCUMENTS

| | | |
|---|---|---|
| DE | 102020007057 A1 | 1/2021 |
| GB | 2559754 A | 8/2018 |
| JP | 5429565 B2 | 12/2013 |

* cited by examiner

*Primary Examiner* — Nicholas Kiswanto
*Assistant Examiner* — Jamal A Shah
(74) *Attorney, Agent, or Firm* — Frank A. MacKenzie; Bejin Bieneman PLC

(57) ABSTRACT

A system and method for providing calibration data for driver assist systems based on a changed ride height includes receiving sensor data from at least one of a camera, RADAR sensor, ultrasonic sensor, and/or LiDAR sensor of the vehicle, determining that a ride height of the vehicle has changed based on the sensor data, retrieving calibration data for at least one driver assist system based upon the changed ride height; and operating the at least one driver assist system using the retrieved calibration data.

20 Claims, 3 Drawing Sheets

ADJUSTING DRIVER ASSIST TECHNOLOGY BASED ON VEHICLE RIDE HEIGHT

BACKGROUND

Electronic stability control (ESC), traction control systems (TCS), antilock braking systems (ABS), and rear backup cameras (with trajectory indicators) have been standard on vehicles for years. Additional driver assist technology (DAT), such as adaptive cruise control (ACC), intelligent adaptive cruise control (iACC), blind-spot monitoring (BSM), rear cross traffic alert (RCTA), lane keep assist (LKA), lane centering assist (LCA), speed sign recognition, park assist systems, evasive steering assist, automatic high-beam headlamps, trailer backup assist, and pre-collision assist with autonomous emergency braking (AEB) systems (i.e., for pedestrians, vehicles, objects), is increasingly being provided on vehicles.

DETAILED DESCRIPTION

Figure 1:
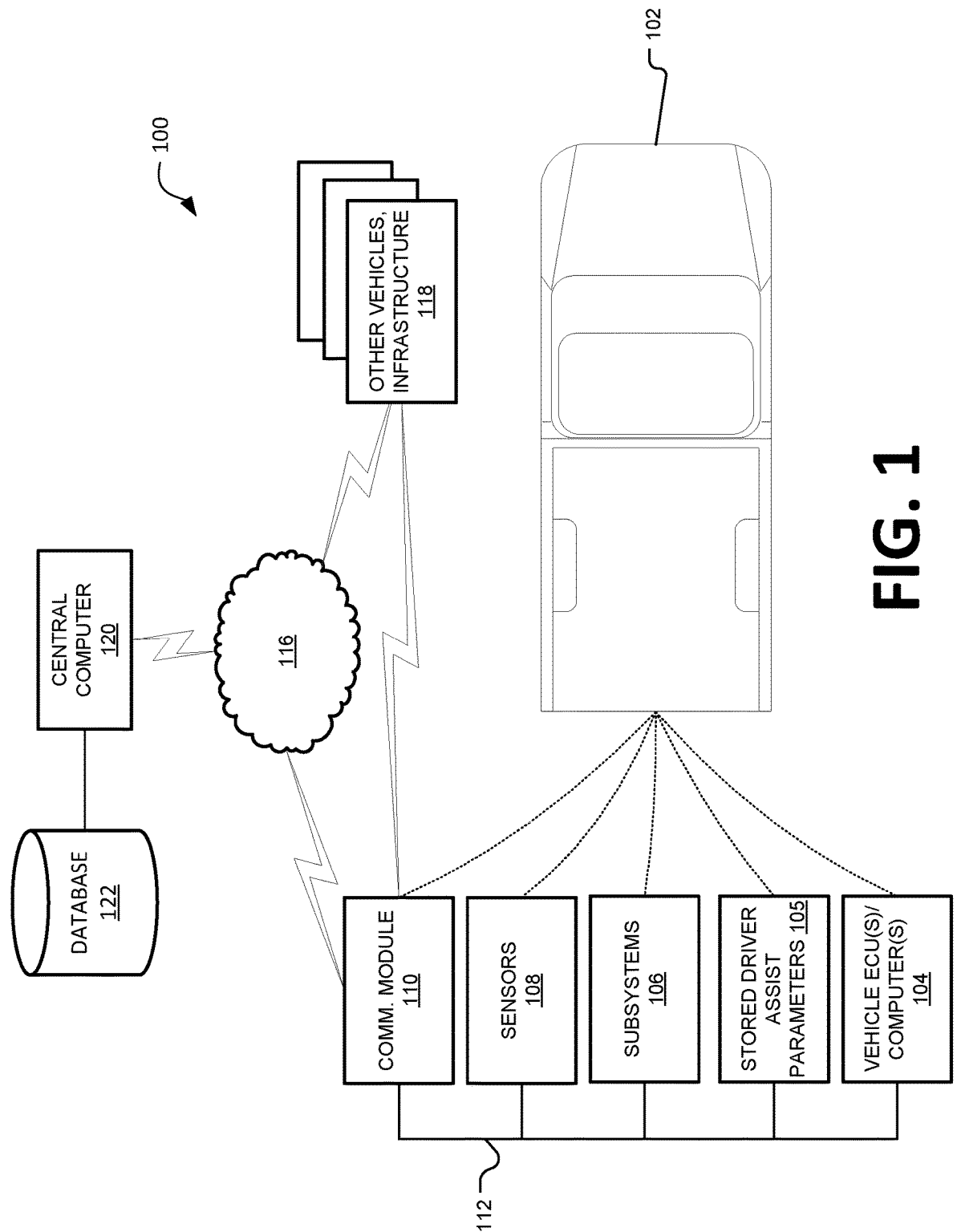
FIG. 1 is a diagram of an example system for adjusting vehicle DAT based on detected ride height.

Many vehicle driver assist technology (DAT) systems rely upon a factory setup (e.g., suspension geometry, center of gravity, tire size and contact patch, wheel offset, wheel camber, sensor positions including height and angle, etc.). When a vehicle is modified from its factory setup, various DAT systems may not operate as expected since they operate using parameters that are calibrated for the factory setup. If the height or angle of the vehicle changes, the height and/or angle of the sensors relative to its surroundings will also change. The change in height of the sensors will alter the intended geometry and/or field of view of the sensor, such that any data from the sensor may be offset from the intended data. In the case of larger or smaller tires, slip controls and powertrain output controls will be affected. Additionally, the height of the vehicle's center of gravity can also change (i.e., be higher or lower) and affect the vehicle dynamics. Systems and methods disclosed herein can advantageously recognize when modifications have been made to a vehicle setup and can dynamically adjust the factory calibrated parameters of the DAT features with revised calibration data based on the modifications. Calibration data for a DAT feature herein is data that provides one or more values for adjustment to sensor data used for the DAT features. As described further below, calibration data, including calibrated parameters that have been modified or adjusted from original factory settings, can be determined in various ways, including by consulting a data store of calibration data, e.g., in a lookup table or the like, and/or by implementing one or more transfer functions that output the calibration data based on input describing one or more current vehicle configurations, e.g., based on modifications to a vehicle factory set up.

In an implementation of the present disclosure, a system may include a vehicle computer having a processor and a memory storing instructions executable by the processor to: receive sensor data from at least one of a camera, RADAR sensor, ultrasonic sensor, and/or LiDAR sensor of the vehicle; determine that a ride height of the vehicle has changed based on the sensor data; retrieve calibration data for at least one driver assist system based upon the changed ride height; and operate the at least one driver assist system using the retrieved calibration data.

In an example implementation, the instructions to receive sensor data may be configured to receive sensor data regarding a current height of a previously sensed object, and the instructions to determine that the ride height of the vehicle has changed may compare a stored height of the previously sensed object to the current height.

A further example implementation may include instructions to: receive data in a vehicle-to-vehicle (V2V) or vehicle-to-infrastructure (V2X) communication regarding a height of a sensed object; and confirm that the ride height of the vehicle has changed based upon determining a different height of the sensed object from the sensor data of the vehicle.

In an example implementation, the sensor data may include a sensed height of an object adjacent a roadway, and the instructions to determine that the ride height of the vehicle has changed may compare the sensed height of the object adjacent the roadway to a stored height of the object adjacent the roadway in a digital map. In an example, the stored height of the object adjacent the roadway may be a stored clearance height of an overpass or an overhead sign.

In another implementation, the instructions to retrieve calibration data may include instructions to access stored calibration data based upon the changed ride height of the vehicle. In an example, the instructions may further disable or reduce a control state of the at least one driver assist system when the changed ride height is not within a range specified in the stored calibration data.

Another implementation may further include instructions to calculate calibration data based on a predefined transfer function based on the changed ride height of the vehicle.

A further implementation may include instructions to: receive wheel speed data and actual vehicle velocity data; compare an expected vehicle velocity based on the received wheel speed data and a tire circumference of the vehicle when manufactured to the actual vehicle velocity data to determine an offset indicative of a different size tire; and determine an amount of the changed vehicle height that is due to the different size tire. In an example, the instructions to retrieve calibration data may include instructions to re-zero inertial sensor calibrations and receive modified yaw and rollover controller gains and deadbands for wheel slip control and/or powertrain output control based upon the different size tire.

In another implementation of the present disclosure, a method for operating a vehicle may include: receiving sensor data from at least one of a camera, RADAR sensor, ultrasonic sensor, and/or LiDAR sensor of the vehicle; determining that a ride height of the vehicle has changed based on the sensor data; retrieving calibration data for at least one driver assist system based upon the changed ride height; and operating the at least one driver assist system using the retrieved calibration data.

In an example implementation, the receiving of sensor data may receive sensor data regarding a current height of a previously sensed object; and the determining that the ride height of the vehicle has changed may compare a stored height of the previously sensed object to the current height.

Another example implementation may include: receiving data in a vehicle-to-vehicle (V2V) or vehicle-to-infrastructure (V2X) communication regarding a height of a sensed object; and confirming that the ride height of the vehicle has changed based upon determining a different height of the sensed object from the sensor data of the vehicle.

In an example implementation, the sensor data may include a sensed height of an object adjacent a roadway, and the determining that the ride height of the vehicle has changed may compare the sensed height of the object adjacent the roadway to a stored height of the object adjacent the roadway in a digital map.

In an example implementation, the stored height of the object adjacent the roadway may be a stored clearance height of an overpass or an overhead sign.

In another example implementation, the retrieving of calibration data may include accessing stored calibration data based upon the changed ride height of the vehicle.

In an example implementation, the method may further include disabling or reducing the control state of the at least one driver assist system when the changed ride height is not within a range specified in the stored calibration data.

In an example implementation, the method may further include calculating calibration data based on a predefined transfer function based on the changed ride height of the vehicle.

In another example implementation, the method may further include: receiving wheel speed data and actual vehicle velocity data; comparing an expected vehicle velocity based on the received wheel speed data and a tire circumference of the vehicle when manufactured to the actual vehicle velocity data to determine an offset indicative of a different size tire; and determining an amount of the changed vehicle height that is due to the different size tire.

In an example implementation, the retrieving of calibration data may re-zero inertial sensor calibrations and retrieve modified yaw and rollover controller gains and deadbands for wheel slip control and/or powertrain output control based upon the different size tire.

With reference to FIG. 1, a connected vehicle system 100 can provide communications between a vehicle 102, one or more other vehicles or infrastructure 118, and a central computer 120, to share data among these various entities.

Vehicle 102 is a set of components or parts, including hardware components and typically also software and/or programming, to perform a function or set of operations in the vehicle 102. Vehicle subsystems 106 typically include a braking system, a propulsion system, and a steering system as well as other subsystems including but not limited to an advanced driver assist system (ADAS), a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers or electronic control units (ECUs) 104 (sometimes referred to herein as vehicle computer 104), processors in other vehicles and infrastructure 118, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more computers/ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more ECUs/computers 104 can be included in a vehicle 102 that may be any suitable type of ground vehicle 102, e.g., a passenger or commercial automobile such as a sedan, a coupe, a truck, a sport utility, a crossover, a van, a minivan, etc. As part of a driver assist system or an advanced driver assist system (ADAS), computer/ECU 104 may include programming to operate one or more of vehicle 102 brakes, propulsion (e.g., control of acceleration in the vehicle 102 by controlling one or more of an internal combustion engine, electric motor, hybrid engine, etc. and control power delivery therefrom), steering, climate control, interior and/or exterior lights, etc., as well as to determine whether and when the computer, as opposed to a human operator, is to control such operations, such as by sending vehicle data over the vehicle network 112. Additionally, an ECU/computer 104 may be programmed to determine whether and when a human operator is to control such operations.

Vehicle computer 104 may include or be communicatively coupled to, e.g., via a vehicle network 112 such as a communications bus as described further below, more than one processor, e.g., included in sensors 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the computer in this disclosure.

The vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, actuators, components, communications module, a human machine interface HMI, etc. Additionally, or alternatively, messages can be exchanged among various such other devices in vehicle 102 via a vehicle network 112. In cases in which the computer includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104, other vehicles/infrastructure 118, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or another vehicle/infrastructure 118, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle or infrastructure 118 typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

A vehicle 102 in accordance with the present disclosure includes a plurality of sensors 108 that may support the driver assist or ADAS functions. For example, sensors 108 may include, but are not limited to, one or more wheel speed sensor, steering angle sensor, GPS sensor, driver-facing camera, back-seat camera, forward-facing camera, side-facing camera, rear-facing camera, ultrasonic parking assist sensor, short range RADAR, medium range RADAR, LiDAR, light sensor, rain sensor, accelerometer, wheel torque sensors, inertial sensor, yaw rate sensor, etc. Sensors 108 can support functions that uses cameras to detect lane lines and road curvature, sometimes in conjunction with detailed mapping data. Sensors 108 may also support a lane keep assist (LKA) or lane centering assist (LCA) function that uses one or more cameras to detect lane lines and a steering angle sensor or support a drive assist function that uses one or more cameras to detect lane lines or monitor blind spots, a steering angle or position sensor, and a driver monitoring system camera (DMSC). Sensors 108 may also support an adaptive cruise control (ACC) function that uses wheel speed sensors/GPS and/or cameras/medium range RADAR/LiDAR to support an automatic follow distance function. Sensors 108 may also support an intelligent adaptive cruise control (iACC) function that uses accelerometers, wheel speed sensors/GPS, cameras, and/or RADAR/LiDAR to support cruise control functions that alter vehicle speed based upon detected speed limits, accelerations, and road curvature. Sensors 108 can support a parking assist function that uses steering sensors, cameras, and/or ultrasonic sensors. Sensors 108 can also support a slip control system or powertrain output control system that uses wheel speed sensors, wheel torque sensors, accelerometers, and/or yaw rate or inertial sensors. For example, slip control and powertrain output control may be provided as part of a "launch control" driver assist feature to aid in acceleration from a standstill or a "rock crawling" feature to aid in off-road situations. Sensors 108 may also support more common driver assist systems such as ABS, ESC, TCS, and roll stability control (RSC).

In some of these operations, sensors 108 such as a camera, RADAR sensor, ultrasonic sensor, and/or LiDAR sensor of the vehicle 102 may detect the position and height of objects relative to the position, height, and angle of the sensor 108 mounted on the body of vehicle 102, including but not limited to the position of lane lines, curbs, overhead signs, speed limit signs, overpasses, and other vehicles.

A vehicle 102 in accordance with the present disclosure includes one or more driver assist system (e.g., DAT and ADAS) that is provided with calibrated parameters at the time of manufacture to support the driver assist operation. Driver assist systems can rely on data from sensors 108 for various operations, including determining input such as a vehicle speed, vehicle steering angle, input concerning proximate objects, etc. Driver assist system parameters are values in a driver assist system that determine one or more outputs of the driver assist system and that can be determined from calibration data. That is, a vehicle configuration or set up of sensors can be taken into account in evaluating data from the sensors for determining a driver assistance system setting that provides a driver assist system output, such as a vehicle 102 proximity to another object, a steering or speed control of the vehicle 102, etc. For example, calibration data could include data describing the configuration (or setup) of a sensor 108 in a vehicle 102, e.g., geometric relationships of the sensors 108 and the vehicle 102, including the suspension geometry (i.e., values describing angles and/or positions of suspension components with respect to each other and/or other vehicle components), the vehicle center of gravity, the positions, heights, and/or angles of the sensors 108, tire size and contact patch. As described herein, when calibration data changes, these changes can be taken into account in determining operation of the driver assist system.

Adjustments to calibration data can be determined based upon empirical testing. For example, a driver assist parameter for the yaw error detection and control of the electronic stability control (ESC), the steering control in the lane keep assist (LCA), the distance ranging of the blind spot monitoring (BSM) system, the yaw and rollover control deadbands of the slip control and powertrain output control systems may include a gain setting used by a proportional-integral-derivative (PID) controller having an angle of a sensor 108 to a horizontal plane as an input to the controller. If a geometric relationship of the sensors 108, such as an angle to a defined plane, is altered by a lowered suspension (e.g., custom springs), raised suspension (e.g., lift kit), or changed tire diameter (e.g. 35" factory tires to 37" tires), such changes may result in large errors from the PID controller without adjusting calibration data, in this example, the specified angle of the sensor 108 to the horizontal plane used to determine a driver assist parameter, in this example the gain setting. As advantageously described herein, a driver assist parameter, rather than being based upon the gain setting based on the factory geometry of the vehicle 102 and its sensors 108, can be based on the altered geometry of the vehicle 102 and its sensors 108.

In accordance with the present disclosure, additional driver assist parameters 105 may be provided with calibration data based upon testing of the vehicle 102 with various other suspension and tire combinations that result in different ride heights. In an implementation, the additional calibration data for the driver assist parameters 105 may be provided in stored data, e.g., in a look up table (LUT) or any other suitable data format or structure. Optionally, since it may be difficult to test vehicle 102 at an extensive number of ride heights or configurations, a smoothing algorithm or the like may be used to interpolate the calibration data when a ride height falls between values in the stored data.

Figure 2:
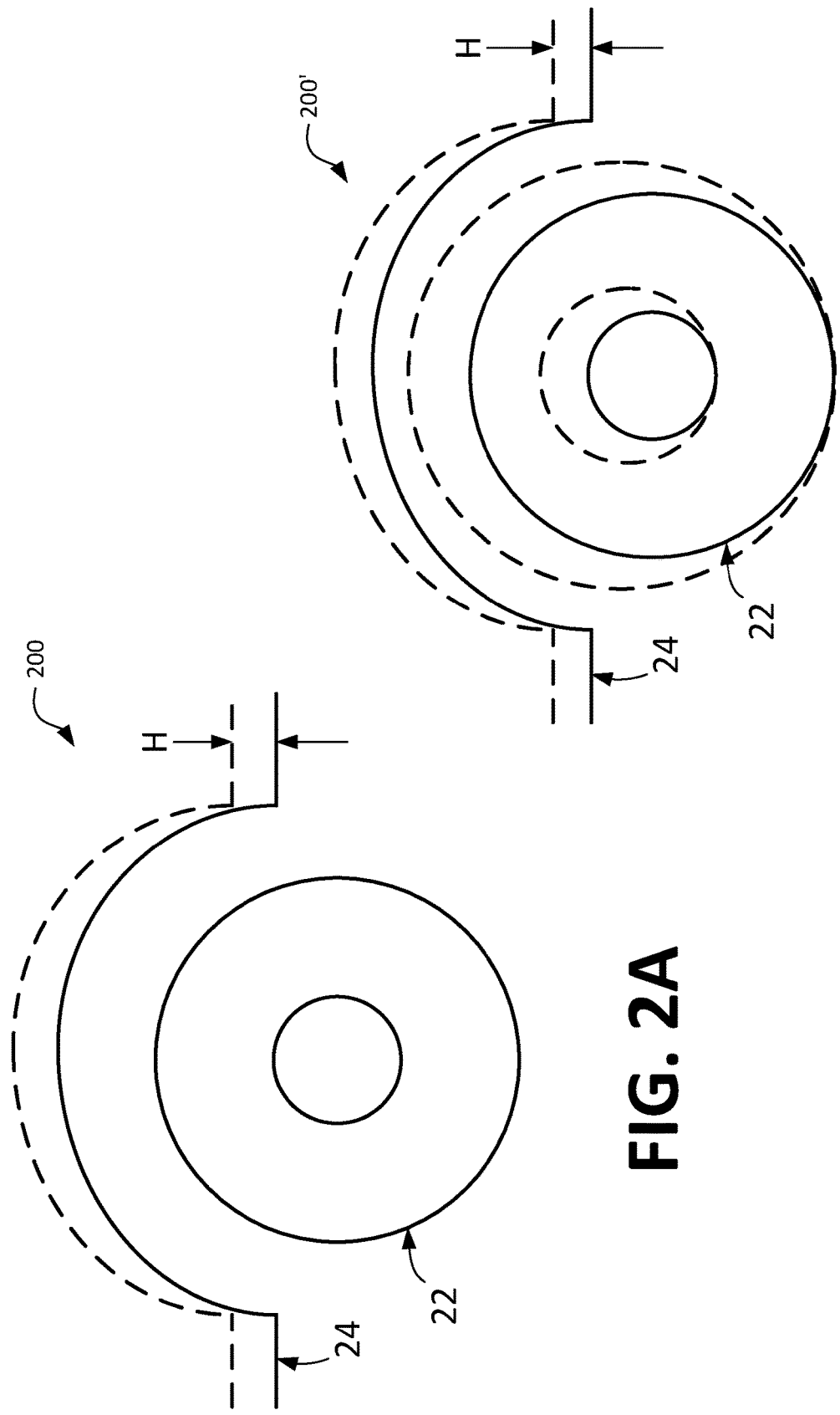
FIG. 2A is a diagram of a ride height change based upon a suspension lift.
FIG. 2B is a diagram of a ride height change based upon a tire size change.

With reference to FIG. 2A, an example 200 of a ride height of a vehicle being changed from an original position (solid line) to a raised position (dashed line) is illustrated based on a suspension lift. A body 24 of a vehicle may be raised by a distance H relative to the tire 22 and the ground by installation of a "lift kit" or "leveling kit."

With reference to FIG. 2B, an example 200' of a ride height of a vehicle being changed from an original position (solid line) to a raised position (dashed line) is illustrated based on installation of a larger tire. A body 24 of a vehicle may be raised by a distance H relative to the ground by installation of a larger tire 22. While FIGS. 2A and 2B illustrate separate causes for a ride height change, combinations of suspension height changes and tire size changes are also possible, such as when a user installs both a lift kit and larger tires for off-road use.

Figure 3:
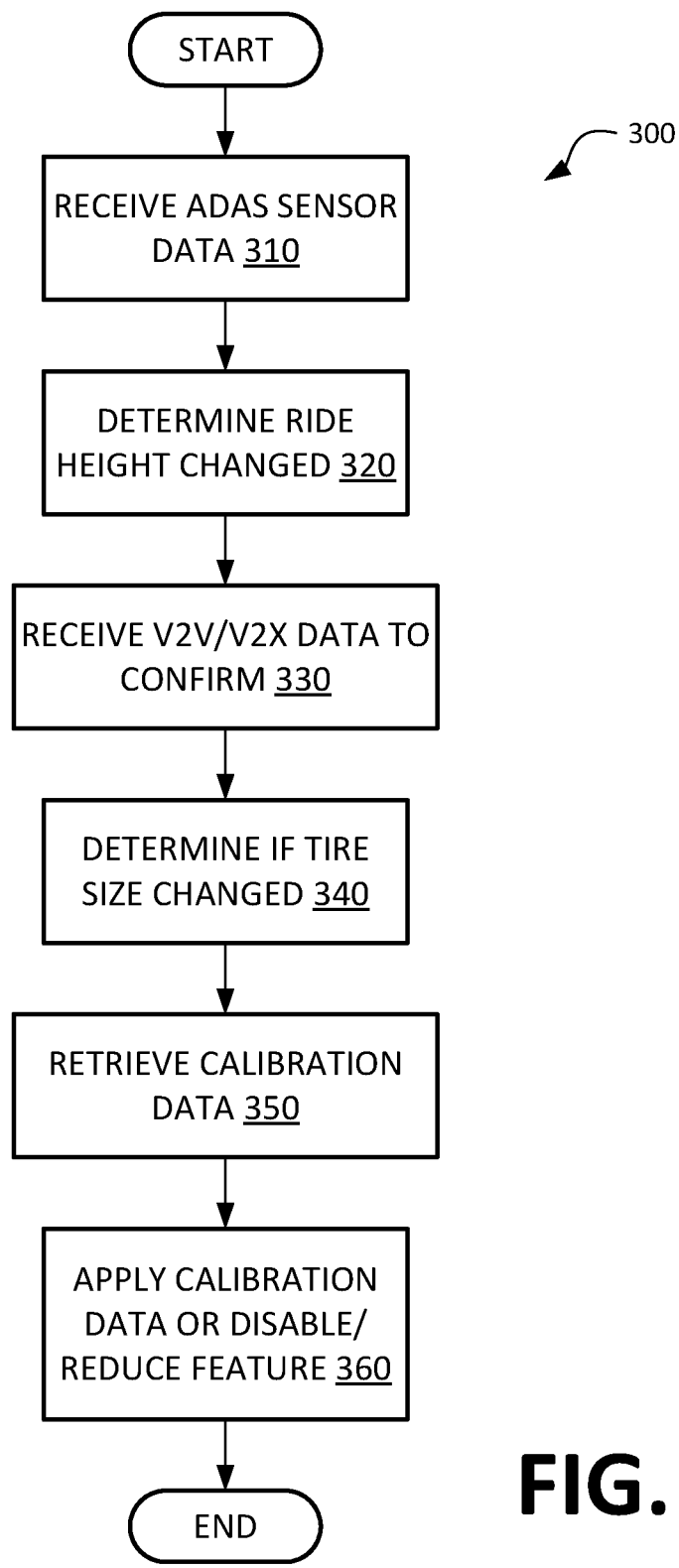
FIG. 3 is a flow diagram of a process to change driver assist system calibration data based upon a detected change in ride height.

With reference to FIG. 3, a flow diagram of a process 300 is shown for changing calibration data for a driver assist system based upon a detected change in ride height (which, if occurring at only one end of the vehicle 102, will also change the rake/angle of the vehicle 102). At a first block 310, computer 104 may receive data from sensors 108, such as data from at least one of a camera, RADAR sensor, ultrasonic sensor, and/or LiDAR sensor of the vehicle 102. Based upon this data, at block 320, the computer 104 may determine that a ride height of the vehicle 102 has changed based on the sensor data. This determination may be made in various ways. In one implementation, an ultrasonic sensor of the ultrasonic parking sensor on a bumper of vehicle 102 may directly measure that the distance to the ground (road surface) is at a different distance than previously measured, and the computer 104 can determine the changed ride height based upon comparing previously measured distance to the currently measured distance from the ultrasonic parking sensor. If it is different between front and rear sensors, the rake/angle may be determined. A rake/angle of the vehicle 102 may also be detected as an offset from a factory-zeroed state of a longitudinal accelerometer while the vehicle 102 is stationary. Estimating vehicle speed by integrating longitudinal acceleration as a function of time while the vehicle 102 is accelerating from a stop, and then comparing that speed estimate to the wheel speed sensor-based speed would give an indication of either an incorrectly zeroed accelerometer (indicative of an angle based on a leveling kit or loading) or change is tire circumference. In another implementation, a camera, RADAR, and/or LiDAR at a fixed location on the body of vehicle 102 may measure a height of a frequently encountered object, such as a top of a garage door opening at a user's residence or the height of a home charging station. The height may be measured in any known manner, such as based on triangulation of multiple measurements taken at the same time (from multiple sensors) or multiple measurements taken at known positions over time (such as from the same sensor).

At block 330, the computer 104 may receive data regarding the height of objects such as the clearance height of overhead signs and overpasses or the ground height of speed limit signs from other vehicles and/or infrastructure 118. This data may be from sensors on the vehicles/infrastructure 118 or from data stored therein, such as digital map data that includes height data of objects. The computer 104 may then use this data to confirm (or deny) that a ride height of the vehicle has changed.

At block 340, the computer 104 may determine if a tire size of the vehicle 102 has been changed. If the longitudinal accelerometer signal is well zeroed while stationary, the longitudinal acceleration from rest can be integrated, compared to wheel speed sensor data, and be used to calculate tire circumference change. This can then be checked against speed calculated from GPS. Alternately, an extended Kalman filter may be used to combine the accelerometer based and GPS based speeds for more accuracy in calculating tire circumference change. In one implementation, this may be another manner to confirm a changed ride height. In one or more other implementations, it may be desirable to determine whether a detected ride height change is due to tire size changes or due to suspension changes since it may affect calculated wheel speed measurements, center of gravity calculations, wheel articulation calculations, the gains for yaw and rollover controllers. Alternatively or additionally, the computer 104 may determine whether or not the detected ride height change falls within a range specified in the stored calibration data (i.e., was a tested configuration), i.e., a ride height change within a specified range could be deemed to not be a change in calibration data, or put another way, to not warrant a change to driver assist parameters. In another implementation, a camera sensor 108 on the vehicle 102 may be able to image the tires and determine if a tire size has changed, and optionally whether a tire camber has been changed (which may also affect the handling of the vehicle 102).

At step 350, computer 104 may retrieve calibration data, such as by using a transfer function that predefined based on empirical testing and/or physical relationships, or from the memory or data store that includes a table or the like of calibration values e.g., values such as ride height, ride height change due to tire size change, ride height change due to suspension change, ride height change at one end (causing a rake/angle change), or combinations thereof. Calibration values from calibration data can then be used to determine driver assist parameters such as gains for PID controllers, etc., that are used to operate a driver assist system, e.g., to determine an input to steering, propulsion (e.g., to control speed), etc. In one or more implementations, calibration values may be interpolated when an actual value, e.g., for a ride height, falls between values, e.g., for ride heights, in the stored calibration data. While calibration data such as a lookup table stored in vehicle 102 is disclosed as one example, the present disclosure is not limited thereto. For example, calibration data may also be provided on demand from database 122 via computer 120 and wide area network 116 so that a manufacturer of vehicle 102 may continuously update a calibration database or transfer functions. As mentioned above, calibration data for respective driver assist system operation can be determined empirically. For example, a vehicle could be operated with various ride heights, etc., to then determine appropriate driver assist parameters which could be stored in a lookup table or the like as calibration data. Alternatively or additionally, a transfer function could be developed that takes as input a newly measured value such as ride height or tire size, and outputs an appropriate parameter value as calibration data for the driver assist system.

Since certain calibration data may be based on a properly zeroed sensor, the computer 104 may instruct sensors such as accelerometers and yaw/pitch/roll rate sensors to re-learn the zeros for all inertial based measurements based on detected suspension height changes above a set threshold. For example, brake controls and any other DAT/ADAS/powertrain features that are based on the corrected inertial signals would benefit from this re-zeroing along with the changing of PID and control deadband values.

At step 360, the stored and retrieved calibration data may be applied to one or more driver assist system of the vehicle 102 (e.g., an ADAS setting). In certain cases, the detected ride height or vehicle configuration resulting in the ride height change will fall outside a range specified in the stored data, or transfer function at step 350, and therefore be unavailable to the computer at step 360. As there is insufficient data to provide suitable calibration data for the vehicle configuration, the vehicle computer 104 may therefore disable one or more driver assist system or put one or more driver assist system into a reduced control state to prevent erroneous operation at step 360. In such a case, a vehicle user may be notified of the issues (such as by setting diagnostic trouble codes related to the feature and illuminating lamps on the instrument cluster), instructed to revert the vehicle 102 to a tested configuration to fully re-enable the one or more driver assist system, or instructed to contact the manufacturer of the vehicle 102 to purchase or otherwise obtain calibration data for a non-standard or non-tested vehicle configuration.

The calibration data may be used to adjust various driver assist system parameters. For example, for camera, RADAR, LiDAR, ultrasonic sensor-based systems, the calibration data may account for the changed position/angle/field of view of the sensor. For inertial, yaw, acceleration-based systems, the calibration data may include controller gains or changes to control deadbands. Thus, for slip control and powertrain output control, when the ride height/tire size has increased, the calibration data may increase the gains for PID yaw and rollover controllers and reduce the yaw and rollover control deadbands (and, conversely, may decrease gains/increase deadband when ride height is lowered). For iACC, the calibration data may, for example, reduce cornering speeds when the height has increased. For LKA/LCA, the calibration data may increase or decrease the gains responsive to steering inputs. For driver assist systems providing vehicle stability, the calibration data may change regenerative braking/torque limits and/or torque biases to optimize vehicle stability in the changed configuration.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising a vehicle computer having a processor and a memory storing instructions executable by the processor to:
    receive sensor data regarding a current height of an object external to a vehicle from a sensor of the vehicle;
    determine that a ride height of the vehicle has changed due to a modification of the vehicle from a factory setup based on the sensor data, including the current height of the object;
    retrieve calibration data for at least one driver assist system based upon the changed ride height; and
    operate the at least one driver assist system using the retrieved calibration data,
    wherein the calibration data provides one or more values for adjustment to sensor data input to the at least one driver assist system.

2. The system of claim 1, wherein the object is a previously sensed object having a stored height; and
the instructions to determine that the ride height of the vehicle has changed compares the stored height of the previously sensed object to the current height.

3. The system of claim 1, further comprising instructions to:
receive data in a vehicle-to-vehicle (V2V) or vehicle-to-infrastructure (V2X) communication regarding a height of the object external to the vehicle; and
confirm that the ride height of the vehicle has changed based upon determining a different height of the object from the sensor data of the vehicle.

4. The system of claim 1, wherein the object is adjacent a roadway, and the instructions to determine that the ride height of the vehicle has changed compares the sensed height of the object adjacent the roadway to a stored height of the object adjacent the roadway in a digital map.

5. The system of claim 4, wherein the stored height of the object adjacent the roadway is a stored clearance height of an overpass or an overhead sign.

6. The system of claim 1, wherein the instructions to retrieve calibration data include instructions to access stored calibration data based upon the changed ride height of the vehicle.

7. The system of claim 6, further comprising instructions to disable or reduce a control state of the at least one driver assist system when the changed ride height is not within a range specified in the stored calibration data.

8. The system of claim 1, further comprising instructions to calculate calibration data based on a predefined transfer function based on the changed ride height of the vehicle.

9. A system comprising a vehicle computer having a processor and a memory storing instructions executable by the processor to:
receive sensor data from a sensor of a vehicle;
determine that a ride height of the vehicle has changed due to a modification of the vehicle from a factory setup based on the sensor data;
receive wheel speed data and actual vehicle velocity data;
compare an expected vehicle velocity based on the received wheel speed data and a tire circumference of the vehicle when manufactured to the actual vehicle velocity data to determine an offset indicative of a different size tire;
determine an amount of the changed vehicle height that is due to the different size tire;
retrieve calibration data for at least one driver assist system based upon the changed ride height; and
operate the at least one driver assist system using the retrieved calibration data,
wherein the calibration data provides one or more values for adjustment to sensor data input to the at least one driver assist system.

10. The system of claim 9, wherein the instructions to retrieve calibration data includes instructions to:
re-zero inertial sensor calibrations;
retrieve modified yaw and rollover controller gains for wheel slip control and/or powertrain output control based upon the different size tire; and
retrieve modified yaw and rollover controller deadbands for wheel slip control and/or powertrain output control based upon the different size tire.

11. A method for operating a vehicle comprising:
receiving sensor data regarding a current height of an object external to a vehicle from at least one of a sensor of the vehicle;
determining that a ride height of the vehicle has changed due to a modification of the vehicle from a factory setup based on the sensor data, including the current height of the object;
retrieving calibration data for at least one driver assist system based upon the changed ride height; and
operating the at least one driver assist system using the retrieved calibration data,
wherein the calibration data provides one or more values for adjustment to sensor data input to the at least one driver assist system.

12. The method of claim 11, wherein the object is a previously sensed object having a stored height; and
the determining that the ride height of the vehicle has changed compares the stored height of the previously sensed object to the current height.

13. The method of claim 11, further comprising:
receiving data in a vehicle-to-vehicle (V2V) or vehicle-to-infrastructure (V2X) communication regarding a height of the object external to the vehicle; and
confirming that the ride height of the vehicle has changed based upon determining a different height of the object from the sensor data of the vehicle.

14. The method of claim 11, wherein the object is an object adjacent a roadway, and the determining that the ride height of the vehicle has changed compares the sensed height of the object adjacent the roadway to a stored height of the object adjacent the roadway in a digital map.

15. The method of claim 14, wherein the stored height of the object adjacent the roadway is a stored clearance height of an overpass or an overhead sign.

16. The method of claim 11, wherein the retrieving of calibration data includes accessing a stored calibration data based upon the changed ride height of the vehicle.

17. The method of claim 16, further comprising disabling or reducing the control state of the at least one driver assist system when the changed ride height is not within a range specified in the stored calibration data.

18. The method of claim 11, further comprising calculating calibration data based on a predefined transfer function based on the changed ride height of the vehicle.

19. The method of claim 11, further comprising:
receiving wheel speed data and actual vehicle velocity data;
comparing an expected vehicle velocity based on the received wheel speed data and a tire circumference of the vehicle when manufactured to the actual vehicle velocity data to determine an offset indicative of a different size tire; and
determining an amount of the changed vehicle height that is due to the different size tire.

20. The method of claim 19, wherein the retrieving of calibration data:
re-zeroes inertial sensor calibrations;
retrieves modified yaw and rollover controller gains for wheel slip control and/or powertrain output control based upon the different size tire; and
retrieves modified yaw and rollover controller deadbands for wheel slip control and/or powertrain output control based upon the different size tire.

* * * * *